United States Patent [19]

Held

[11] Patent Number: 5,105,338

[45] Date of Patent: Apr. 14, 1992

[54] COMPUTER PORTFOLIO WITH LAP-TOP COMPUTER RELEASABLY SECURED TO BRACKETS

[76] Inventor: Michael E. Held, 4105 Tolowa St., San Diego, Calif. 92117

[21] Appl. No.: 696,108

[22] Filed: May 6, 1991

[51] Int. Cl.⁵ .............. H05K 7/16; A45C 3/00; G06F 1/00
[52] U.S. Cl. .................... 361/391; 206/305; 190/109; 190/903; 364/705.06; 235/1 D
[58] Field of Search ........... 364/705.02, 705.06, 364/708; 206/305; 190/115, 109, 901, 903; 235/1 D; 361/380, 390, 391, 392, 393, 394, 395, 399

[56] References Cited

U.S. PATENT DOCUMENTS

| | | | |
|---|---|---|---|
| 4,424,899 | 1/1984 | Rosenburg | 206/305 |
| 4,515,493 | 5/1985 | Radovich | 402/4 |
| 4,658,956 | 4/1987 | Takeda et al. | 206/305 X |
| 4,703,160 | 10/1987 | Narishima et al. | 235/1 |
| 4,754,790 | 7/1988 | Meyers | 150/104 |
| 4,790,431 | 12/1988 | Reel et al. | 206/305 |
| 4,837,590 | 6/1989 | Sprague | 346/145 |
| 4,872,538 | 10/1989 | Fournier | 190/111 |
| 4,896,776 | 1/1990 | Kabanuk et al. | 206/576 |

Primary Examiner—Leo P. Picard
Assistant Examiner—Michael W. Phillips
Attorney, Agent, or Firm—Brown, Martin, Haller & McClain

[57] ABSTRACT

A computer portfolio includes two side panels of soft material secured along a fold line for folding between an open position and a closed position in which the panels are face to face to form an enclosure. One of the side panels has a rigid base plate secured in a pocket between inner and outer layers of the panel, and mounting brackets project from the base plate through the inner layer. A lap-top computer is releasably secured to the mounting brackets.

10 Claims, 3 Drawing Sheets

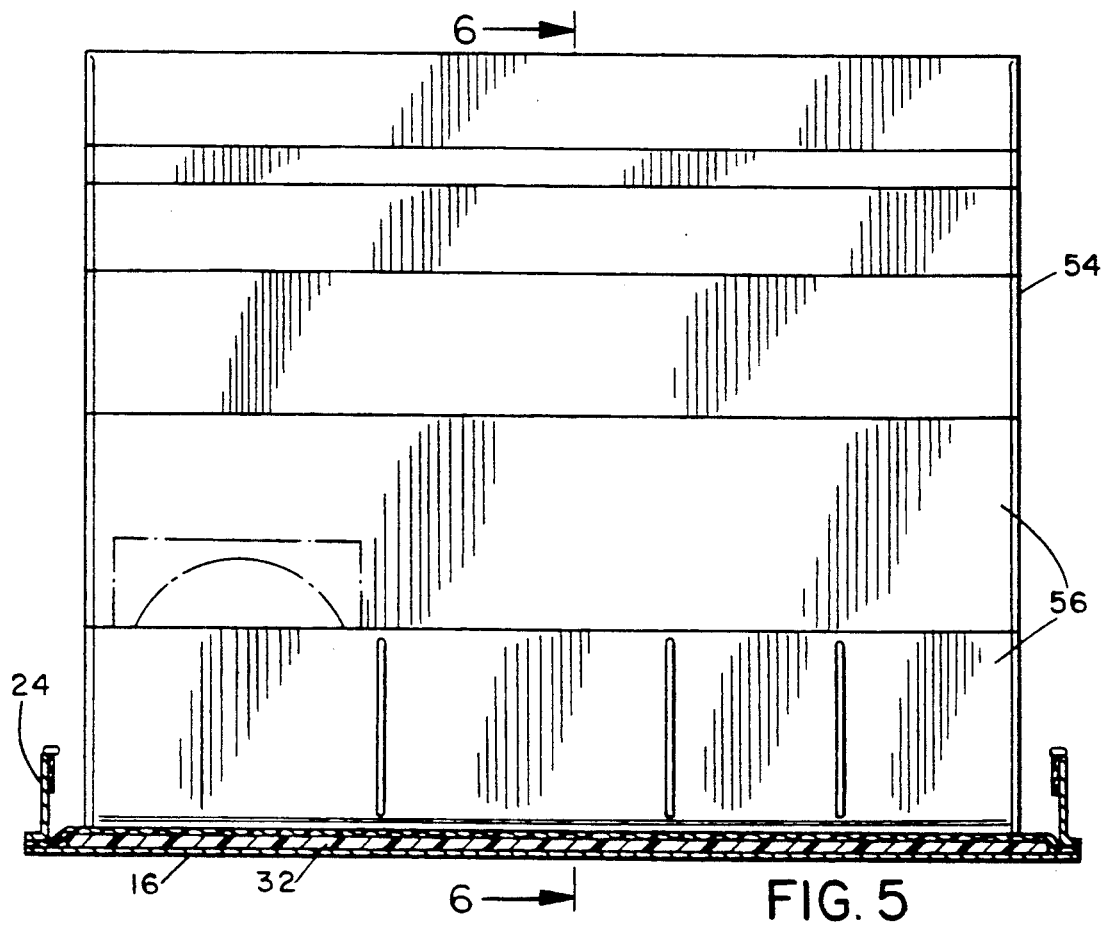
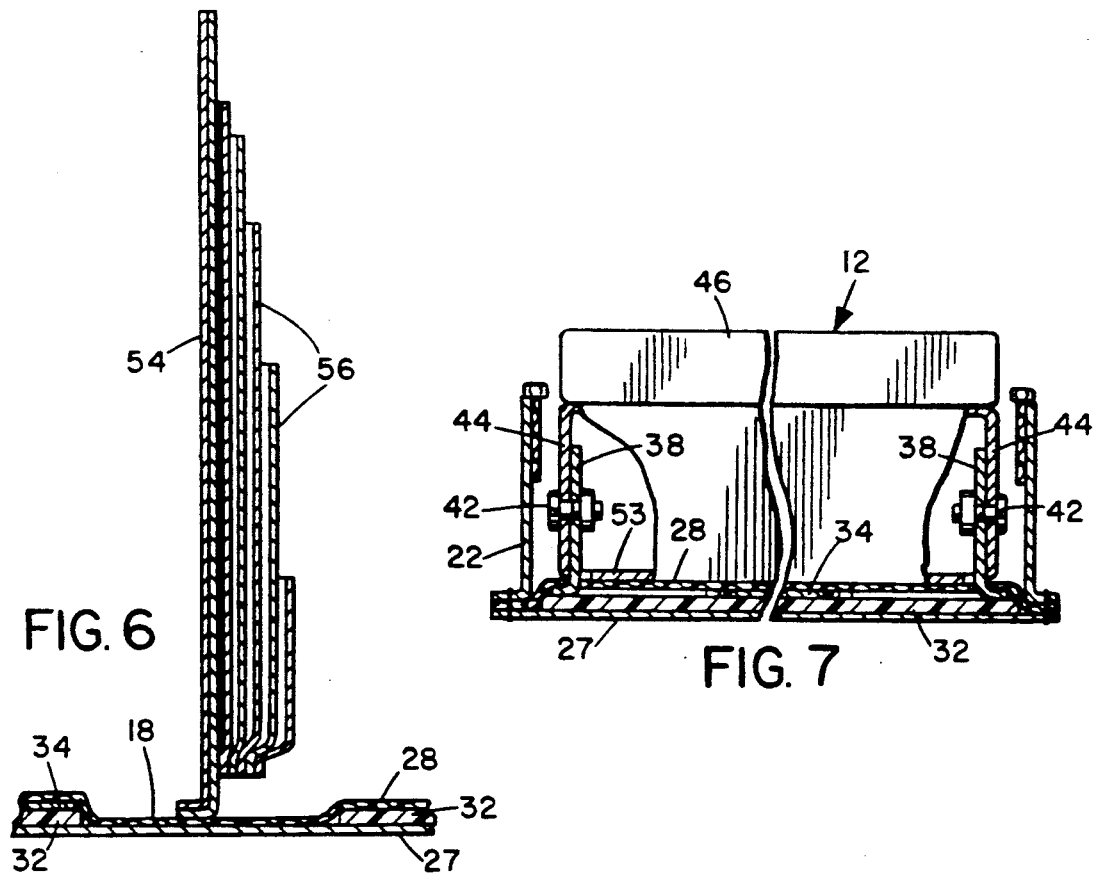

COMPUTER PORTFOLIO WITH LAP-TOP COMPUTER RELEASABLY SECURED TO BRACKETS

BACKGROUND OF THE INVENTION

The present invention relates generally to a portfolio or casing for carrying and using a lap-top or portable computer.

Carrying cases for computers and similar electronic equipment have been proposed in the past for use by people when travelling on business, for example. These have generally been relatively large and cumbersome, adding to the load of luggage which must often be carried by hand during at least part of a journey.

One example of a computer carrying case is described in U.S. Pat. No. 4,837,590 of Sprague, for example. This carrying case has a rigid outer shell and sufficient internal space to support a lap-top computer, printer and printer paper, cellular telephone, and multiple chamber collapsible file folder. The computer is secured to a raised platform in the base by a plurality of screw fasteners which are not readily accessible after installation. U.S. Pat. No. 4,896,776 describes another carrying case for data processing equipment having a raised platform for supporting a computer, another platform for a printer, storage space for printer paper, as well as various pockets for carrying supplies and other equipment.

SUMMARY OF THE INVENTION

It is an object of the present invention to provide a new and improved case or portfolio for carrying a computer.

According to the present invention, a computer portfolio is provided, which comprises a casing of soft material having two side panels hingedly secured together along a fold line for folding between a flat, fully open position and a closed position in which the panels are face to face to form an enclosure between their opposing faces, and a releasable fastener mechanism such as a zipper for releasably securing the panels together in the closed position. A rigid base plate is enclosed in a pocket in one of the side panels, and has a pair of upstanding mounting brackets which extend inwardly through the innermost wall of the pocket. A portable, lap-top computer is releasably mounted on the brackets. The computer has an outer shell or housing having downwardly depending side walls which are releasably secured to the respective brackets via screw fasteners or the like.

Preferably, the internal components of the computer are enclosed in a thin, lightweight metal outer frame or housing rather than the usual plastic shell, to reduce RFI problems. The video screen is pivotally mounted on the upper wall of the frame so that it can be positioned at any desired angle for use.

This arrangement provides a thin, lightweight, soft material portfolio for carrying and protecting a computer when not in use, which at the same time can be used to form a working base for the computer while travelling, via the rigid base plate sheathed in one of the side panels of the portfolio. The computer can be detached from the casing quickly and easily if required for maintenance or other purposes, simply by unfastening it from the side flanges. A notebook may be mounted on the other side panel of the casing for making notes while working at the computer. The casing dimensions are slightly larger than those of the computer itself. Pockets for carrying various materials such as computer discs and the like may be suitably secured inside the casing, for example to the side panel opposite the computer or in pockets provided on a separate divider wall or panel.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 5 is an enlarged sectional view taken on line 5—5 of FIG. 3;

FIG. 6 is a sectional view taken on line 6—6 of FIG. 5;

FIG. 7 is a sectional view taken on line 7—7 of FIG. 4;

DESCRIPTION OF THE PREFERRED EMBODIMENTS

Figure 1:
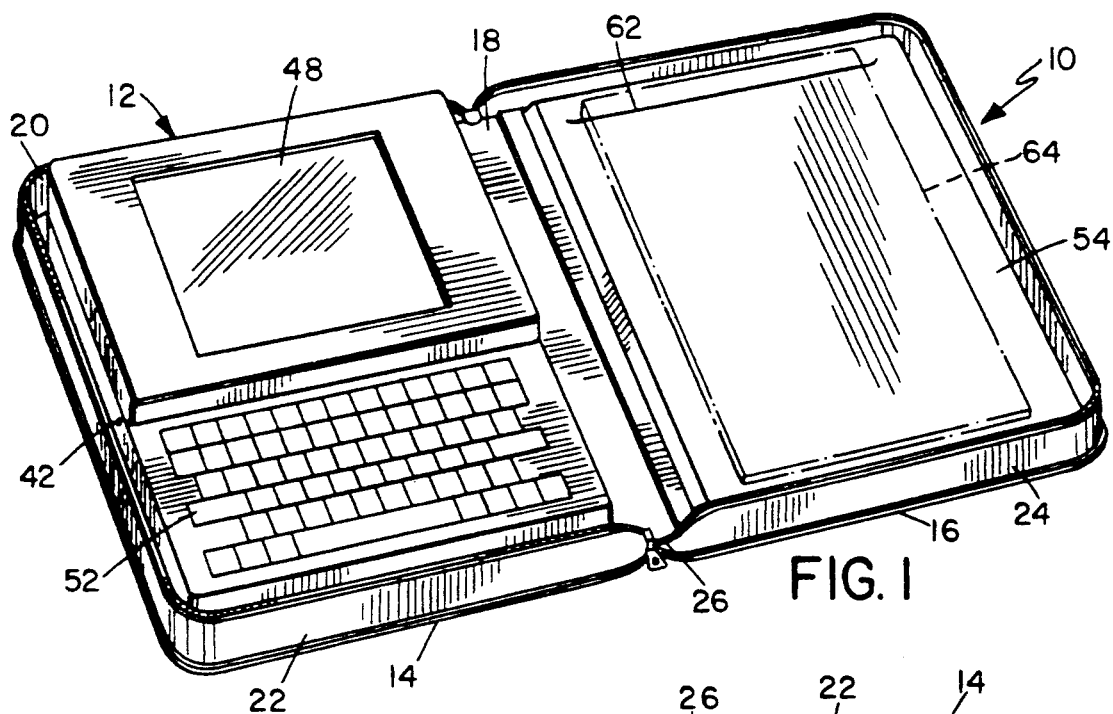
FIG. 1 is a perspective view of the computer portfolio according to a first embodiment of the invention in open position ready for use.

FIGS. 1 to 7 illustrate a computer portfolio 10 for carrying a lap-top computer 12 according to a first embodiment of the present invention. The portfolio 10 basically comprises a casing of soft material such as leather, soft plastic or soft fabric material having side panels 14, 16 hinged together along integral, central fold line or region 18 for movement between the fully open position illustrated in FIG. 1 and the closed position illustrated in FIG. 2 in which the panels are face to face to form an enclosure 20.

Figure 2:
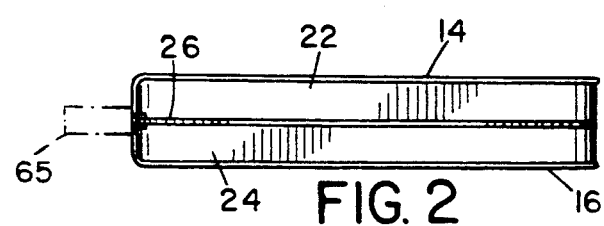
FIG. 2 is a side elevation view of the closed portfolio.

Each panel has a raised rim or peripheral wall 22, 24 extending around its three free peripheral edges, and a zipper 26 extends around the uppermost edges of the walls 22, 24 to allow the panels to be releasably secured together when in the closed position of FIG. 2.

Figure 4:
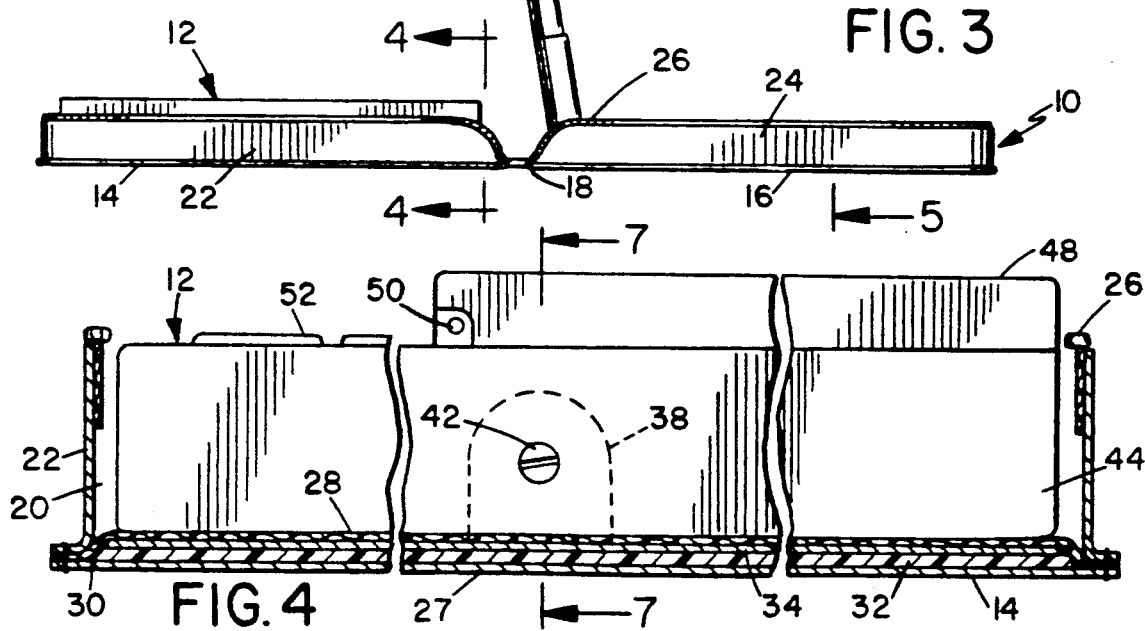
FIG. 4 is an enlarged sectional view taken on line 4—4 of FIG. 3.

As best illustrated in FIGS. 4 and 6, the side panels are integrally formed from two layers of suitable material sewn or otherwise secured together to form an outer wall or layer 27 and an inner wall or layer 28 with a pocket 30 in each panel between the layers in which layers 32 of padding material such as foam are inserted. Additionally, a base plate 34 of rigid material such as sheet metal is inserted in pocket 30 of side panel 14, as illustrated in FIGS. 4 and 7. Upstanding mounting brackets 36, 38 are cut out and bent up adjacent opposite side edges of plate 34 and extend upwardly through suitable slits in inner wall 28.

Lap-top computer 12 comprises a base housing 46 having downwardly depending side walls 44 and a video display unit 48 pivotally mounted on base housing 46 via pivot hinge 50. The base housing is open at its lower end and is releasably mounted on brackets 36, 38 via suitable screw fasteners 42 extending through aligned openings in the brackets and downwardly depending side walls 44 of the computer housing 46. The internal electronic components of computer 12 are of a conventional nature as used in standard lap-top computers, but instead of the standard plastic housing for such computers, the components are housed in housing 46 which is of sheet metal and which may be covered by a suitable fabric, leather or plastic coating on its outer surfaces, for example to match the material of casing 10. The video display screen 48 is of a conventional construction and is pivoted to housing 46 via pivot 50 so that it can be supported at any desired angle of inclination. Screen 48 is also preferably housed in a sheet metal enclosure suitably covered in a similar material to the base housing 46. The base housing includes a standard keyboard 52 and is of a similar shape and dimensions to standard lap-top computers, but has suitable slots in its bottom wall 53 for engaging over mounting brackets 36 and 38 and mounting onto the base plate 34. Alternatively, the computer housing may be open at its lower end. The overall assembly can be made relatively thin and compact, and the computer can be easily used either attached to the portfolio or separate from it.

Figure 3:
FIG. 3 is a side elevation view of the opened portfolio, with the pocket unit raised.

An additional divider wall or panel 54 is secured to the inner wall of the assembly along fold line 18, as illustrated in FIGS. 3 and 6. This may have a plurality of superimposed pockets 56 of various sizes on one of its faces 58 for carrying various materials such as paper, computer discs, batteries, pens and so on, while the opposite face may have a single pocket 62 for carrying a notebook 64, as indicated in dotted lines in FIG. 1.

The casing may have a suitable carrying handle, for example as illustrated in dotted outline in FIG. 2. This arrangement provides a casing for easily carrying and storing a small, lap-top computer while travelling. The casing is relatively soft, compact and lightweight and thus does not add excessive load to the amount of luggage a traveller must transport. The computer can be easily detached from the base when necessary for maintenance or other purposes, and the base of the computer housing is effectively enclosed in one side panel of the casing itself, so that the overall casing can be made as thin as possible, and the computer is made an integral part of the casing itself. The rigid base plate in panel 14 also forms a base support for the computer when placed on a person's lap, for example.

Figure 8:
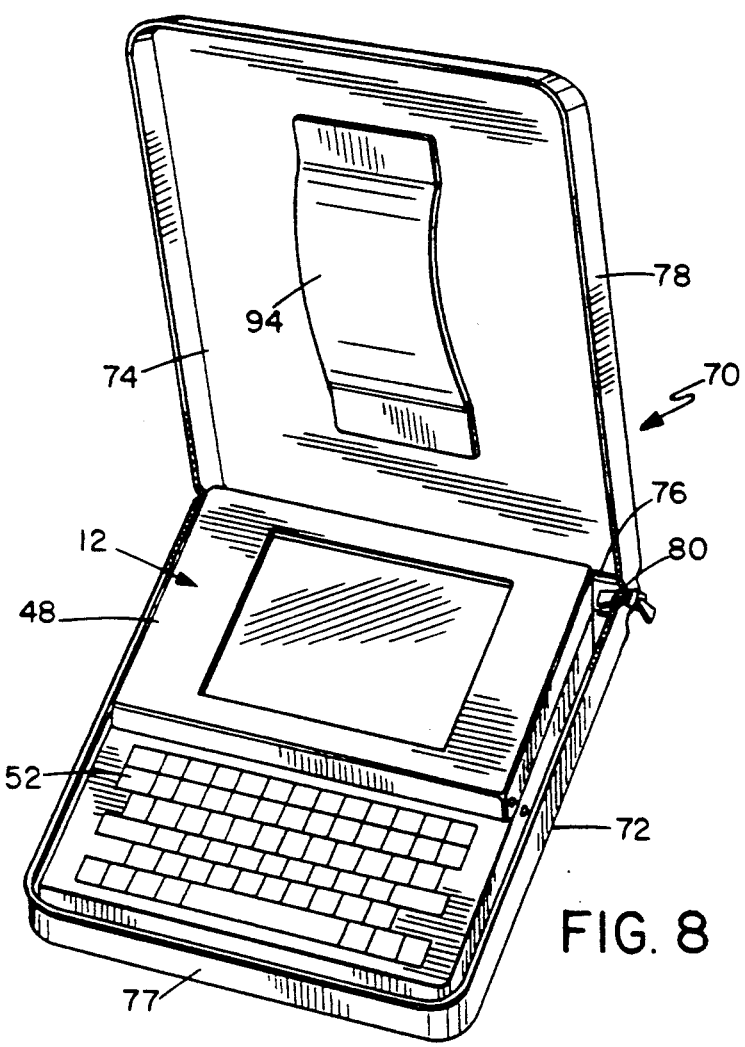
FIG. 8 is a perspective view of an alternative portfolio configuration with the cover raised.
Figure 9:
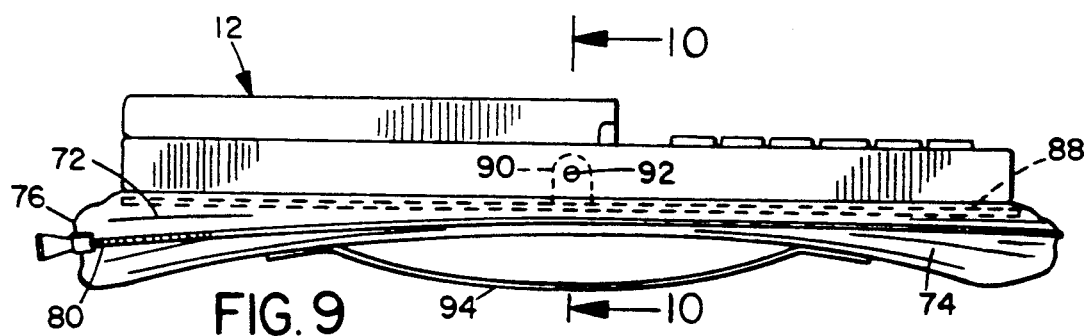
FIG. 9 is a side elevation view of the portfolio of FIG. 8, with the cover folded back and secured in fully open position.
Figure 10:
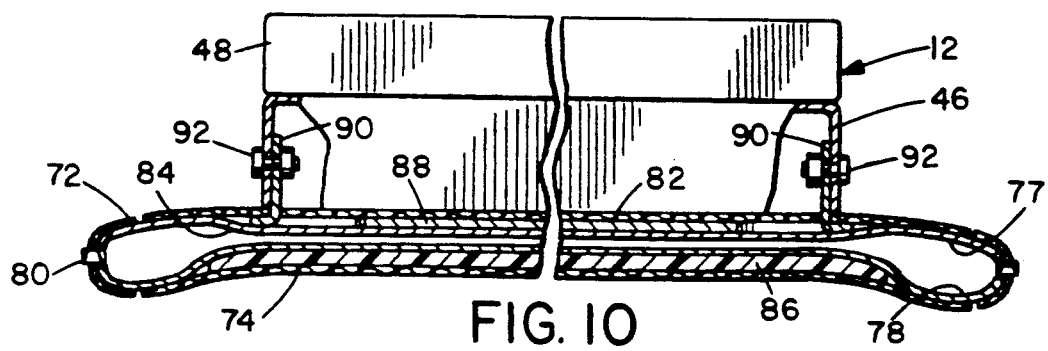
FIG. 10 is an enlarged sectional view taken on line 10—10 of FIG. 9.

FIGS. 8 to 10 illustrate a modified embodiment of the invention in which portfolio 70 is designed for carrying lap-top computer 12. Lap-top computer 12 is similar to that of the previous embodiment, and like reference numerals have been used where appropriate.

Portfolio 70 comprises integrally formed side panels 72, 74 joined together along fold line 76. Each side panel has a raised rim 77, 78 extending around its three free peripheral edges, and the opposing panels can be secured together when the panel 74 overlies panel 72 in a closed position via a reversible or double zipper 80 extending around the three peripheral edges. The panels are formed from inner and outer layers 82, 84 of suitable material such as leather or plastic. A layer 86 of padding material is provided between layers 82 and 84 of the side panel 74, and a rigid backing plate 88 of metal sheet material is provided between layers 82 and 84 of side panel 72. Ears or mounting brackets 90 project inwardly from opposite sides of plate 88 through inner layer 82 and the bottom wall of the computer housing, and the computer 12 is releasably mounted on brackets 90 via suitable screw fasteners 92 extending through aligned openings in brackets 90 and side walls 44 of the computer housing. Thus, side panel 72 of the portfolio effectively forms a rigid base on which the computer can be used.

A handle loop or band 94 is provided on the inner side of side panel 74. The pivot or hinge line 76 between the panels has sufficient flexibility to allow the panel 74 to be doubled back completely into a reversed position so that its outer face is face to face with the outer face of panel 72, as illustrated in FIGS. 9 and 10. In this position, reversible zipper 80 can also be closed to secure panels 72 and 74 together to form a cushioned base for the computer as it is used, while handle loop 94 can be grasped to support the unit if no surface is available for resting the computer.

This embodiment is more slim line than the first embodiment since the pocket panel is eliminated. It provides a computer and integral case which is small enough to be carried in a separate enclosure such as a standard briefcase or suitcase.

The computer portfolio described above provides a compact carrying case for a computer which can be used conveniently when travelling or at other times to store and protect a slim-line computer. The computer is attached to a rigid base plate enclosed within one side panel of the portfolio itself, making the computer an integral part of the casing but allowing the computer to be detached easily when necessary for maintenance, for example. This also further reduces the dimensions of the casing, which may have a thickness of as little as 2 to 3 inches and overall dimensions of the order of those of a standard notebook, or slightly larger than a slim-line, lap-top computer, for example of around 13 inches by 14½ inches when closed.

Since the computer components are enclosed in an outer shell of metal rather than plastic, radio frequency interference (RFI) is reduced, and the metal shell can be covered with a coating layer of a material matching the material of the portfolio itself, for example leather or plastic.

Although some preferred embodiments of the present invention have been described above by way of example only, it will be understood by those skilled in the field that modifications may be made to the disclosed embodiments without departing from the scope of the invention, which is defined by the appended claims.

I claim:

1. A computer portfolio, comprising:
    an outer casing of soft material having two side panels hingedly secured together along a fold line for folding between a fully open position and a closed position in which the panels are face to face to form an enclosure between the panels;
    at least one of the panels comprising inner and outer layers forming a pocket between the layers;
    a rigid base plate enclosed in the pocket, the base plate having a pair of upstanding brackets projecting through the inner layer of the panel into the enclosure; and
    a lap-top computer releasably mounted on the brackets.

2. The portfolio as claimed in claim 1, including a releasable fastener mechanism for releasably securing the panels together in the closed position.

3. The portfolio as claimed in claim 2, wherein each panel has a raised rim extending around its free peripheral edge, and said fastener mechanism comprises a zipper extending around said raised rims.

4. The portfolio as claimed in claim 2, wherein said fastener mechanism comprises a reversible zipper for securing said panels together in said closed position in which their inner faces face inwardly into said enclosure and for selectively securing said panels together in a reversed, open position in which one of the panels is folded back parallel to the other panel with its inner face facing outwardly.

5. The portfolio as claimed in claim 4, wherein said one panel has handle means on its inner face.

6. The portfolio as claimed in claim 1, wherein the computer has an outer housing having downwardly depending side walls, each bracket being releasably secured to a respective one of said side walls.

7. The portfolio as claimed in claim 1, wherein the computer has an outer housing of metal sheet material and a cover layer of the same material as the casing covering the outer surface of said housing.

8. The portfolio as claimed in claim 1, wherein the panels are integrally formed from inner and outer continuous layers of material, each panel having a layer of padding material interposed between said inner and outer layers.

9. The portfolio as claimed in claim 1, including a divider panel secured along said fold line between said two side panels, said divider panel having a plurality of pockets.

10. A computer portfolio, comprising:
an outer casing of soft material having two side panels hingedly secured together along a fold line for folding between a fully open position and a closed position in which the panels are face to face to form an enclosure between the panels; at least one of the panels comprising inner and outer layers forming a pocket between the layers;
a rigid base plate enclosed in the pocket; and
mounting means on the base plate projecting through the inner layer of the panel into the enclosure for releasably mounting a lap-top computer on said one panel.

* * * * *